United States Patent
Parkvall et al.

(10) Patent No.: US 11,201,710 B2
(45) Date of Patent: Dec. 14, 2021

(54) SEARCH SPACE MONITORING

(71) Applicant: Telefonaktiebolaget LM Ericsson (publ), Stockholm (SE)

(72) Inventors: Stefan Parkvall, Bromma (SE); Havish Koorapaty, Saratoga, CA (US); Daniel Chen Larsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 5 days.

(21) Appl. No.: 16/610,839

(22) PCT Filed: May 4, 2018

(86) PCT No.: PCT/SE2018/050470
§ 371 (c)(1),
(2) Date: Nov. 4, 2019

(87) PCT Pub. No.: WO2018/208211
PCT Pub. Date: Nov. 15, 2018

(65) Prior Publication Data
US 2021/0143953 A1  May 13, 2021

Related U.S. Application Data

(60) Provisional application No. 62/505,553, filed on May 12, 2017.

(51) Int. Cl.
*H04W 4/00* (2018.01)
*H04L 5/00* (2006.01)
*H04W 72/12* (2009.01)

(52) U.S. Cl.
CPC .......... *H04L 5/0048* (2013.01); *H04L 5/0035* (2013.01); *H04W 72/1273* (2013.01)

(58) Field of Classification Search
None
See application file for complete search history.

(56) References Cited

U.S. PATENT DOCUMENTS

| | | |
|---|---|---|
| 2014/0146799 A1 | 5/2014 | Park et al. |
| 2014/0254420 A1 | 9/2014 | Kim et al. |
| | (Continued) | |

FOREIGN PATENT DOCUMENTS

| | | |
|---|---|---|
| CN | 103095415 A | 5/2013 |
| CN | 103139926 A | 6/2013 |
| | (Continued) | |

OTHER PUBLICATIONS

Russian Decision on Grant and Search Report dated Jul. 28, 2020 issued in corresponding Russian Application No. 2019136529, consisting of 28 pages.

(Continued)

*Primary Examiner* — Phirin Sam
(74) *Attorney, Agent, or Firm* — Christopher & Weisberg, P.A.

(57) ABSTRACT

A wireless device monitors search spaces by receiving an orthogonal frequency-division multiplexing, OFDM, symbol in a downlink slot. The OFDM symbol is included in a control-resource set, CORESET, of resource elements configured to carry control information. The CORESET is associated with at least one property. The wireless device identifies at least one first property of the at least one property of the CORESET. The wireless device monitors at least one particular search space for a control message related to the wireless device based on the identified at least one first property of the CORESET.

21 Claims, 3 Drawing Sheets

(56) References Cited

U.S. PATENT DOCUMENTS

| | | | |
|---|---|---|---|
| 2014/0254452 | A1 | 9/2014 | Golitschek Edler Von Elbwart et al. |
| 2014/0269336 | A1 | 9/2014 | Lee et al. |
| 2016/0112934 | A1 | 4/2016 | Yamada et al. |
| 2017/0041907 | A1 | 2/2017 | Seo et al. |
| 2017/0048829 | A1 | 2/2017 | Kim et al. |
| 2020/0021419 | A1* | 1/2020 | Taherzadeh Boroujeni ........ H04L 5/0091 |
| 2020/0119869 | A1* | 4/2020 | Taherzadeh Boroujeni ........ H04L 5/0094 |
| 2020/0259586 | A1* | 8/2020 | Seo ................. H04L 1/00 |
| 2020/0344616 | A1* | 10/2020 | Hwang ............. H04L 5/0053 |

FOREIGN PATENT DOCUMENTS

| | | |
|---|---|---|
| RU | 2012 145 231 A | 5/2014 |
| WO | 2016/064048 A1 | 4/2016 |

OTHER PUBLICATIONS

Australian Examination Report dated Jul. 29, 2020 issued in corresponding Australian Patent Application No. 2018266439, consisting of 6 pages.

Communication Pursuant to Article 94(3) EPC dated Apr. 13, 2021 issued in corresponding European Application No. 18 725 330.7, consisting of 6 pages.

Korean Intellectual Property Office Notice of Preliminary Rejection and English translation of same, dated Nov. 24, 2020 issued in corresponding Korean Application No. 10-2019-7033761, consisting of 15 pages.

International Search Report and Written Opinion dated Aug. 2, 2018 issued in PCT Application No. PCT/SE2017/050503, consisting of 11 pages.

Samsung: "Multi-beam Transmission for NR-PDCCH",3GPP Draft; RI-1707987, May 6, 2017 (May 6, 2017), XP051262164; consisting of 7 pages.

Hijawei et al.: "Configuration of control resource set", 3GPP Draft; RI-1706943, May 8, 2017 (May 8, 2017), XP051263405; consisting of 4 pages.

Hijawei et al.: "Search space design", 3GPP Draft; RI-1706944, May 8, 2017 (May 8, 2017),XP051263406 consisting of 4 pages.

Ericsson: "Overview of DL Control Channel Design",3GPP Draft; RI-1709062, May 7, 2017 (May 7, 2017), XP051263327; consisting of 10 pages.

Korean Intellectual Property Office Notice of Final Rejection and English translation of same, dated May 27, 2021 issued in corresponding Korean Application No. 10-2019-7033761, consisting of 7 pages.

Japanese Office Action with English Summary Translation of the Japanese Office Action dated Jul. 12, 2021 issued in corresponding Japanese Patent Application No. 2019561309, consisting of 5 pages.

3GPP TSG RAN WG1 NR Ad Hoc Meeting R1-1700405; Title: QCL Indication of Downlink Control Channel and Beam Management Reference Signals; Agenda Item: 5.1.2.2; Source: Huawei, HiSilicon; Document for: Discussion and Decision; Date and Location: Jan. 16-20, 2017, Spokane, USA, consisting of 4 pages.

3GPP TSG RAN WG1 Meeting #89 R1-1707161; Title: SS Splitting Among Different CORESETs and Blind Decoding Agenda Item: 7.1.3.1.2; Source: ZIE; Document for: Discussion and Decision; Date and Location: May 15-19, 2017, Hangzhou, China, consisting of 4 pages.

Chinese Office Action with English Translation of the Text of the Chinese Office Action dated Sep. 3, 2021 issued in corresponding Chinese Patent Application No. 2018800316528, consisting of 11 pages.

Indian First Examination Report dated Oct. 7, 2021 issued in Indian Patent Application No. 201947046334 consisting of 7 pages.

* cited by examiner

SEARCH SPACE MONITORING

CROSS-REFERENCE TO RELATED APPLICATIONS

This application is a Submission Under 35 U.S.C. § 371 for U.S. National Stage Patent Application of International Application No.: PCT/SE2018/050470, filed May 4, 2018 entitled "SEARCH SPCE MONITORING," which claims priority to U. S. Provisional Application No.: 62/505,553, filed May 12, 2017, the entireties of both of which are incorporated herein by reference.

TECHNICAL FIELD

Embodiments presented herein relate to a method, a wireless device, a radio access network node, a computer program, and a computer program product for monitoring search spaces.

BACKGROUND

New Radio (NR) uses Orthogonal Frequency Division Multiplexing (OFDM) in the downlink. The basic NR downlink physical resource may thus be regarded as a time-frequency grid, where each resource element corresponds to one OFDM subcarrier during one OFDM symbol interval. Multiple sub-carrier spacings are supported in NR, for example 15 kHz, 30 kHz or 60 kHz.

Physical downlink control channels (PDCCHs) are used in NR for downlink control information (DCI), e.g. downlink scheduling assignments and uplink scheduling grants. The PDCCHs are in general transmitted at the beginning of a slot and relate to data in the same or a later slot, but a User equipment (UE) can, in principle, be configured to monitor PDCCHs more often than once per slot, e.g. to handle mini-slot-based transmissions. (It is recalled that an NR slot may correspond to 7 or 14 OFDM symbols; at 15 kHz subcarrier spacing, a slot with 7 OFDM symbols occupies 0.5 ms. Concerning NR terminology generally, reference is made to 3GPP TR 38.802 v14.0.0 and later versions.) Different formats (sizes) of the PDCCHs are possible to handle different DCI payload sizes and different aggregation levels (i.e. different code rate for a given payload size). A UE is configured (implicitly and/or explicitly) to blindly monitor (or search) for a number of PDCCH candidates of different aggregation levels and DCI payload sizes. Upon detecting a valid DCI message (i.e. the decoding of a candidate is successful and the DCI contains an identity (ID) of the UE is told to monitor) the UE follows the DCI (e.g. receives the corresponding downlink data or transmits in the uplink). The blind decoding process comes at a cost in complexity in the UE but is required to provide flexible scheduling and handling of different DCI payload sizes.

The DCI could also be used in combination with Radio Resource Control (RRC) signaling to signal a quantity needed for transmission or reception. One example is signaling of resources to be used for feedback signaling in the uplink such as hybrid automatic repeat request (HARQ) acknowledgements. Indicating the complete location in the uplink may result in too large DCI overhead. Instead, a two-bit index can be transmitted as part of the DCI and used as an index into a table, selecting one out of four preconfigured (or predefined) entries.

This way, he DCI could also be used in combination with RRC signaling to signal a quantity needed for transmission or reception. One example is signaling of resources to be used for feedback signaling in the uplink such as HARQ acknowledgements. Indicating the complete location in the uplink may result in too large DCI overhead. Instead, a two-bit index can be transmitted as part of the DCI and used as an index into a table, selecting one out of four preconfigured (or predefined) entries. This way, the DCI overhead can be kept small while at the same time allow for a significant amount of flexibility to handle different deployment scenarios and operating conditions. In principle, the same approach can be used for any control information, i.e. not only the HARQ resources to be used in the uplink. See FIG. 7.

In NR, there are currently discussions on how to configure control resource regions where the UE can monitor for PDCCH transmissions and how a UE can be configured with multiple control resource regions. Some of these control regions may be used for sending common control messages that are intended for multiple UEs and some may be intended for UE-specific control messages. A control region could serve both common and UE-specific control messages. One difference in NR from the 3rd Generation Partnership Project Long Term Evolution (LTE) is that the carrier bandwidths may be larger and hence there are benefits seen in the control region not spanning the entire bandwidth of the carrier. Thus, it is expected that control regions will be limited in time and in frequency.

Control regions generally need to be dimensioned to ensure that multiple UEs can be signaled within the region. In order to do this, statistical multiplexing principles are used where the number of UEs that are assigned to a control region to search for control messages is much greater than the resource available in the control region. Therefore, the search spaces for different UEs are randomized so that statistical multiplexing can be used to minimize the blocking probability when any particular UE needs to be scheduled. Therefore, it can be expected that control regions are dimensioned to enable multiple UEs to signal PDCCHs simultaneously. It can further be expected that the number of UEs being assigned to monitor the control region is greater than the number of UEs that can simultaneously be signaled.

In the following, a CORESET is a control resource set that is configured to the UE. A CORESET is a set of Resource Elements (Res) that spans a set of Physical Resource Blocks (PRBs) in frequency and OFDM symbols in time. A UE may be configured to monitor one or more CORESETs for the potential reception of one or more PDCCHs. CORESETs for one UE or different UEs can in principle be (partly) overlapping. For simplicity, in FIG. 2 it is assumed that the CORESETs are not partly overlapping.

Using the resources defined by a CORESET blind decoding using one or more search spaces can be performed to detect the valid PDCCH(s), if any (see FIG. 2). A number of resources in a CORESET form a control channel element (CCE). The UE attempts to blindly decode PDCCHs using one or more of these CCEs. Typically, different search spaces use different aggregation levels, where an aggregation level is the number of CCEs used by a PDCCH candidate. For example, the search space on aggregation level 1 monitor for PDCCH candidates consisting of a single CCE, the search space on aggregation level 2 monitor for PDCCH candidates consisting of pairs of CCEs, etc. A rule determines which CCEs (or set of CCEs) that constitute a PDCCH candidate in each search space. The rule may be pre-agreed between the transmitting parties (e.g., through a network standardized specification) or may be indicated in advance by signaling.

Increasing the amount of dynamically conveyed control information is however problematic, since this results in increased overhead. Depending on the implementation, the total signaling overhead may be sensitive to an increase in DCI payload. The growth in overhead may be linear. Therefore, it is desirable to convey the DCI efficiently.

SUMMARY

An object of the present disclosure is therefore to mitigate the above problems and offer search space monitoring of improved efficiency.

According to the disclosure, a CORESET is associated with certain properties, which may affect the handling of blind detection in search spaces.

In particular, according to one aspect of the disclosure, a method performed by a wireless device comprises: receiving an OFDM symbol in a downlink slot, the OFDM symbol being included in a CORESET of resource elements configured to carry control information, the CORESET being further associated with at least one property; identifying at least one first property of the at least one property of the CORESET; monitoring at least one particular search space for a control message related to the wireless device based on the identified at least one first property of the CORESET; establishing a location of the control message with respect to at least one of the CORESET and the search space; determining at least one of a first assumed quasi co-location and a first beam pair link for the wireless device, if a first location is established for the control message; and determining at least one of a second assumed quasi co-location and a second beam pair link for the wireless device, if a second location is established for the control message, which second location is different from the first location.

According to another aspect of the disclosure, the method for monitoring search spaces is likewise performed by a wireless device. Here, a potential set of search spaces to monitor contains search spaces of different aggregation levels, and the method comprises: receiving an OFDM symbol in a downlink slot, the OFDM symbol being included in a CORESET of resource elements configured to carry control information, the CORESET being further associated with at least one property; identifying at least one first property of the at least one property of the CORESET; and monitoring one particular search space for a control message related to the wireless device, wherein the particular search space has a distribution of aggregation levels and is selected based on the identified at least one first property of the CORESET.

The above strategies are advantageous because they reduce the downlink control signaling overhead. The management of blind detection also becomes more efficient.

Further advantages, beneficial features and applications will be apparent from the following description and the dependent claims.

BRIEF DESCRIPTION OF THE DRAWINGS

The proposed solution is now to be explained more closely by means of preferred embodiments, which are disclosed as examples, and with reference to the attached drawings, on which.

DETAILED DESCRIPTION

The disclosure proposes that each CORESET should be associated with one or more properties.

Alternatively or additionally, a property of a first CORESET is characteristically different from a corresponding property of a second CORESET. In particular, the first CORESET may be associated with a first value of a parameter or variable, while the second CORESET may be associated with a second value of the same parameter or variable, wherein the first and second values are characteristically different. A UE attempting to decode the first or second CORESET may ascertain the value of the parameter or variable and adopt its behavior accordingly. The UE may behave differently if it decodes a different CORESET, as shown by the property of the CORESET. The UE behavior may relate to the CORESET decoding as such or to an operational task, such as a radio operational task. Said properties can be used in many ways.

In one embodiment, the property of a CORESET affects blind decoding of PDCCH candidates in that CORESET. For example, more blind decoding attempts can be spent on one CORESET than in another CORESET. Another possibility is to distribute the blind decodings across search spaces in different CORESETs. For example, in one CORESET there could be more blind decodings spent on higher aggregation levels than lower aggregation levels while in another CORESET the distribution could be different. In this example, it may make sense to spend more blind decoding attempts at higher aggregation levels on search spaces using the CORESET where such broadcast control information is transmitted which is intended to reach multiple users, is transmitted while in CORESETs where the dedicated scheduling control information is transmitted there may be an incentive to use more blind decoding attempts on lower aggregation levels.

In another embodiment, the number of blind decodings to be performed in a given CORESET may be determined in proportion to the ratio of number of CCEs in that CORESET to the total number of CCEs in all CORESETs that the UE is configured with. In another variation of this embodiment, this approach may only be used across all UE-specific CORESETs with the CORESET carrying a common search space having a fixed number of blind decoding attempts.

Another way of using some of the properties of a CORESET (and/or the properties of a search space) is to exploit it to convey part of the downlink control information: the CORESET in which a PDCCH is found could also be used to convey part of the control information. Upon detection of a valid PDCCH containing DCI, the UE knows:
  in which search space the PDCCH was detected, and/or
  in which CORESET the PDCCH was detected (at least if the CORESETs are non-overlapping).

Figure 4:
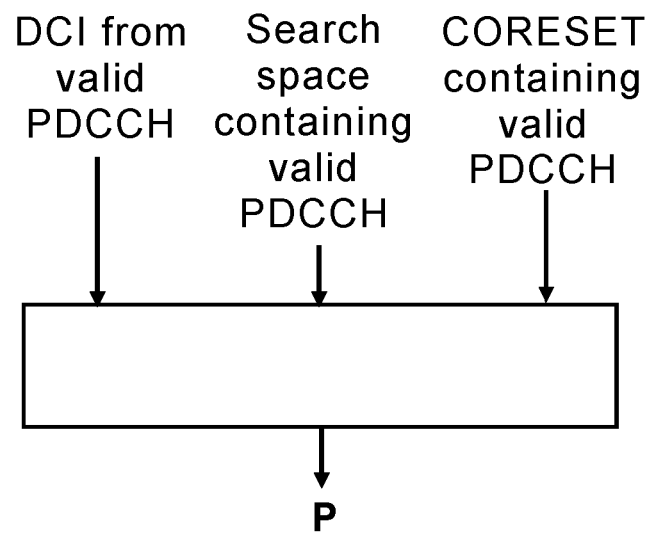
FIG. 4 illustrates how a parameter relating to downlink control information can be derived according to one embodiment of the disclosure.
Figure 8:
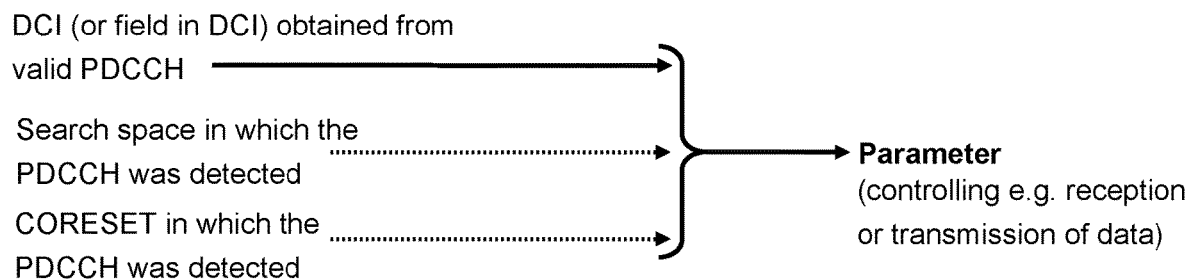
FIG. 8 illustrates how a parameter can be derived according to one embodiment of the disclosure.
Figure 8:
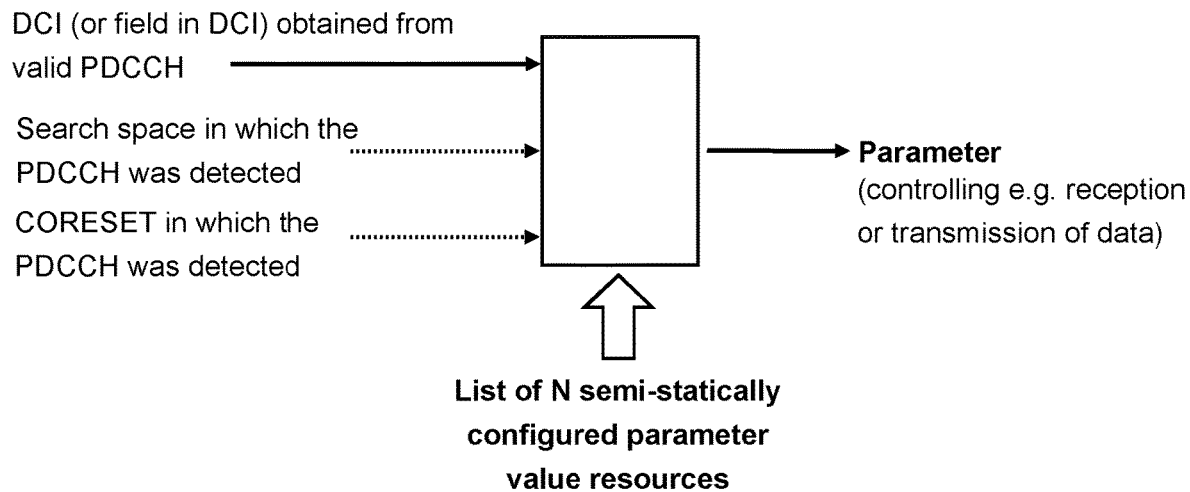

This information can be used to convey downlink control information to the UE, either directly (as shown in FIG. 4) or indirectly (as shown in FIG. 8). The table in FIG. 8 could be predefined or (semi-statically) configured through e.g. RRC or MAC signaling.

Alternatively or additionally, the variability of this information causes the UE to interpret the DCI in different ways. Phrased differently, a basic meaning of signaling in the DCI may be overlaid with a further meaning if the DCI is received in a CORESET associated with a particular property.

The general approach of providing part of the downlink control information indirectly through the search space and/or CORESET can be used in multiple ways.

The search space can affect which Modulation and Coding Scheme (MCS) table to use. A search space with a higher aggregation level (e.g. 8 CCEs) is mainly useful when scheduling data in a coverage-limited scenario (and hence the data rates are lower) while a lower aggregation level (e.g. a single CCE) is mainly useful when there is less of a coverage problem (and hence the data rates are higher). This can be used to select between two different tables for transport block sizes and modulation orders. A table supporting lower data rates/smaller transport block sizes for the higher aggregation level case and a table supporting higher data rates/larger transport block sizes for the low aggregation level case. The table selection can also be based on whether the PDCCH was detected in a common or UE-specific search space; common search spaces are used to address many users receiving the same broadcasted information, in which case the data rates are lower, compared to a UE-specific search space.

Another embodiment is the configuration of the meaning of the bits in a bitfield that gives the starting and ending positioning of physical downlink shared channel (PDSCH) or physical uplink shared channel (PUSCH), could depend on which CORESET or search space the UE detects the DCI message in (or at least some values may differ in the bitfield compared to the whole bitfield).

Another embodiment is the configuration of the lengths of the bitfields in the DCI message based on the location of the CORESET. If the CORESET is not in the beginning of a slot in time, at least some of the bitfields may have a shorter length for indication of the PDSCH/PUSCH than if the CORESET is in the beginning of the slot.

In another embodiment, cross-slot scheduling is based on the CORESET/search space in which the DCI message is located. If the DCI message is located in a certain CORESET, then PDSCH is scheduled in the same slot; and if it is in another CORESET, then the PDSCH comes in following slot preceding the slot in which the DCI is located. This property of the CORESET can be defined as part of the RRC configuration of the CORESET.

In another embodiment, the QCL assumptions or the Beam pair link assumptions that the UE makes are different depending on the CORESET/search space in which the DCI message is located.

In another embodiment, the UE uses Convention-Based Grant (CBG) based information either for scheduling or HARQ feedback if the DCI message is located within a given search space or CORESET.

Figure 1:
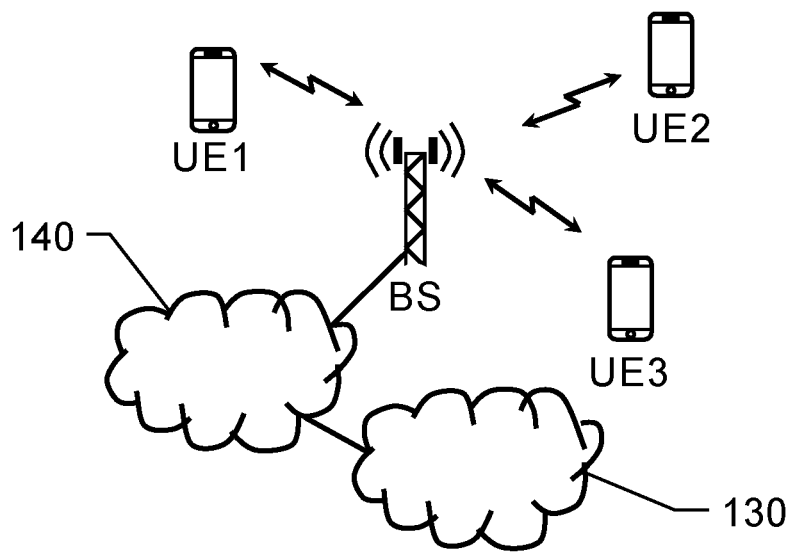
FIG. 1 schematically shows a communication network according to embodiments of the disclosure.
Figure 2:
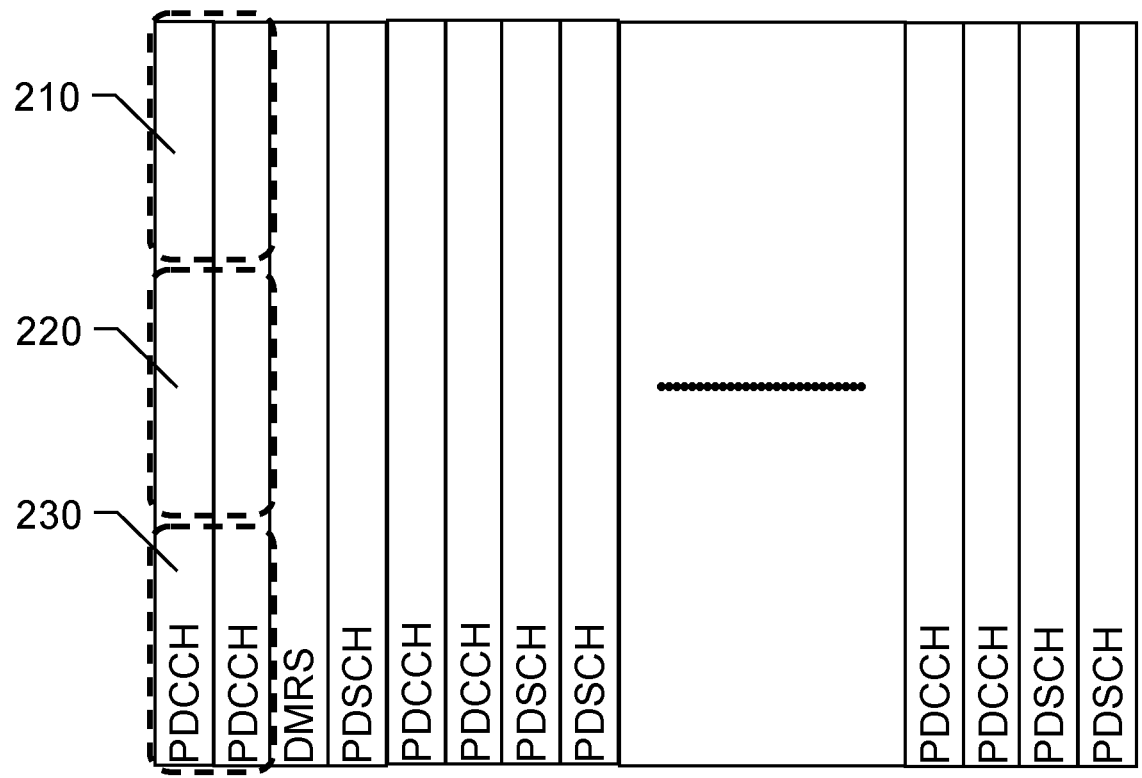
FIG. 2 illustrates subframe structure according to one embodiment of the disclosure.

FIG. 1 schematically shows a communication network according to one embodiment of the disclosure. Here a radio access network node BS, e.g. implementing an NR base station or a gNB (Next Generation Node B), is arranged to enable the monitoring of search spaces. The radio access network node BS is communicatively connected to a radio base station network 130, which may be further connected to a general network 140. In any case, radio access network node BS contains processing circuitry and a communication interface. The processing circuitry, in turn, is configured to cause the radio access network node BS to transmit an OFDM symbol in a downlink slot. The OFDM symbol is included in a control-resource set, CORESET. In FIG. 2, reference numerals 210, 220 and 230 exemplify such resource elements in a subframe structure, which resource elements are configured to carry control information. The CORESET is associated with at least one property that is configured to form a basis for at least one particular search space for a wireless device to monitor in search for a control message related to the wireless device. FIG. 1 shows such wireless devices in the form of UE1, UE2 and UE3 respectively, which may for example be represented by mobile phones, handsets, terminals etc.

Figure 3:
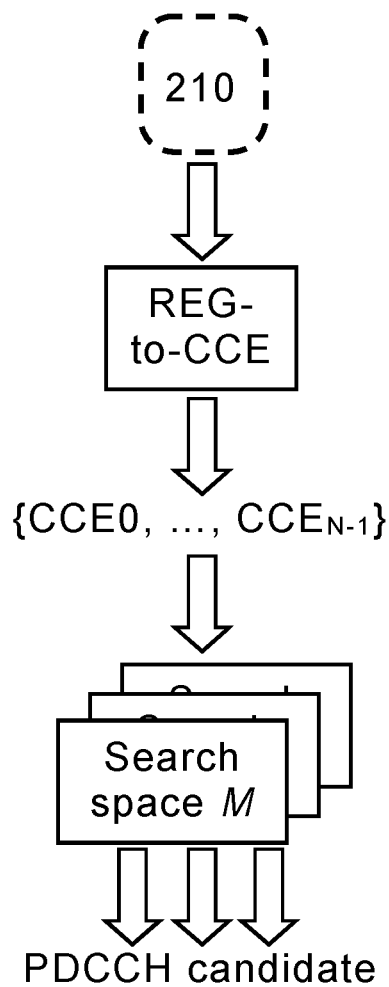
FIG. 3 illustrates how search spaces are monitored according to one embodiment of the disclosure.

FIG. 3 illustrates how search spaces are monitored according to one embodiment of the disclosure. More precisely, using the resources defined by the CORESET, blind decoding is applied in one or more search spaces to detect any valid PDCCH(s).

Here, we let a number of resources in the CORESET 210 form a control channel element, CCE. The wireless device is controlled to attempts to blindly decode PDCCHs using one or more of these CCEs, CCE0, ..., $CCE_{N-1}$. Typically, different search spaces use different aggregation levels. An aggregation level is the number of CCEs used by a PDCCH candidate. For example, on a first aggregation level, the search space to monitor for PDCCH candidates may include a single CCE. On a second aggregation level, the search space to monitor for PDCCH candidates may instead include pairs of CCEs, and so on, up to a Search space M. The CCEs, or set of CCEs, which constitute a PDCCH candidate in each search space is given by a rule known by the wireless device. In FIG. 3, this is illustrated by a mapping REG-to-CCE.

Figure 5:
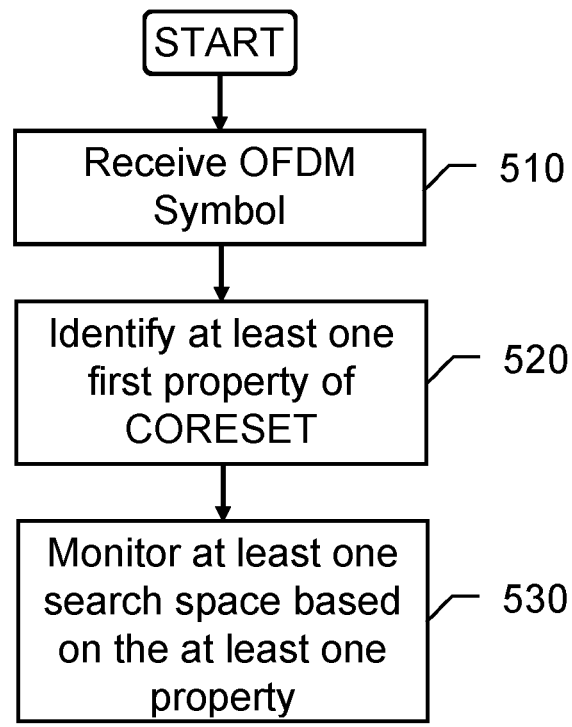
FIG. 5 illustrates, by means of a flow diagram, a method according to one embodiment of the disclosure.
Figure 7:
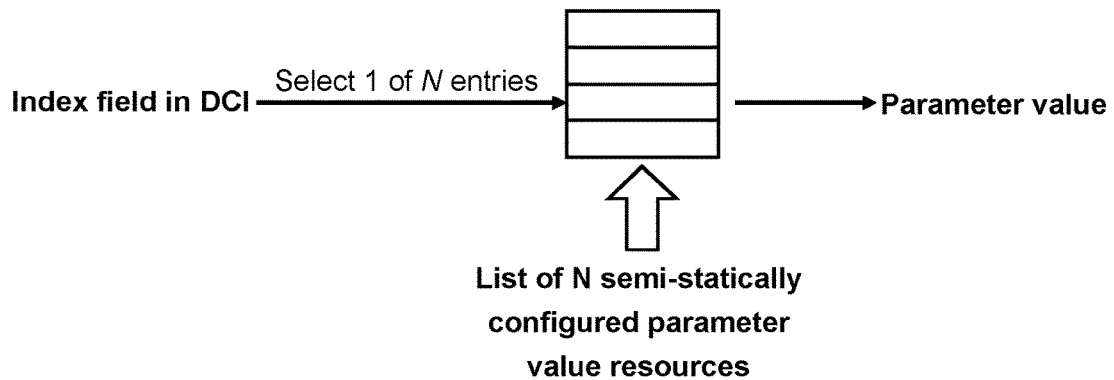
FIG. 7 describes a combination of dynamic and semi-static signaling of a parameter value.

Now, to illustrate a method according to one embodiment of the disclosure for monitoring search spaces in a wireless device, we refer to the flow diagram in FIG. 5.

Here, in a first step 510, an OFDM symbol is received in a downlink slot. The OFDM symbol is included in a CORESET of resource elements that are configured to carry control information. It is further presumed that the CORESET is associated with at least one property.

In a subsequent step 520, at least one first property of the at least one property of the CORESET is identified.

Thereafter, in a step 530, at least one particular search space is monitored for a control message that is related to the wireless device. The monitoring is based on the at least one first property of the CORESET identified in step 520.

According to one aspect of the disclosure, a location of the control message is established with respect to the CORESET and/or the search space. According to this aspect, a first assumed quasi co-location and/or a first beam pair link for the wireless device are/is also determined, if a first location is established for the control message.

Moreover, the method involves determining a second assumed quasi co-location and/or a second beam pair link for the wireless device, if a second location is established for the control message, which second location is different from the first location.

All of the process steps of FIG. 5 may be controlled by means of at least one programmed processor. Moreover, although the embodiments of the disclosure described above with reference to the drawings comprise processor and processes performed in at least one processor, the disclosure thus also extends to computer programs, particularly computer programs on or in a carrier, adapted for putting the disclosure into practice. The program may be in the form of source code, object code, a code intermediate source and object code such as in partially compiled form, or in any other form suitable for use in the implementation of the process according to the disclosure. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal, which may be conveyed via electrical or optical cable or by, radio or by other means. When the program is embodied in a signal which may be conveyed directly by a cable or other device or means, the carrier may be constituted by such cable, device, or means. Alternatively, the carrier may be an integrated circuit in which the program is embedded, the integrated circuit being adapted for performing, or for use in the performance of, the relevant processes.

Figure 6:
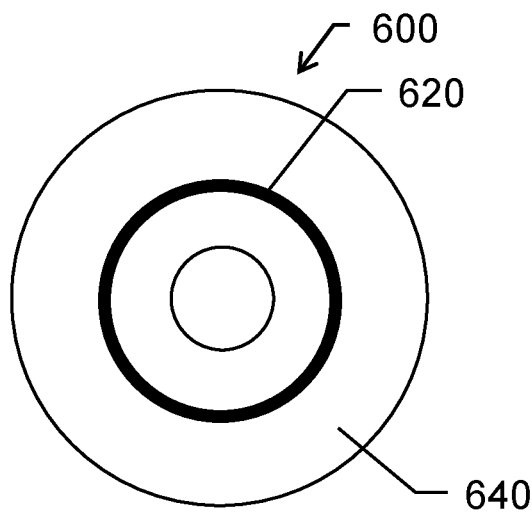
FIG. 6 shows a schematic example of a computer program product containing computer readable media according to embodiments of the disclosure.

FIG. 6 shows a schematic example of a computer program product 600 in the form of a computer readable storage medium 640, e.g. a CD ROM (Compact Disc Read-Only Memory) or a DVD (Digital Versatile Disc), containing computer a computer program 620 configured to perform the proposed method when executed in at least one processor.

The term "comprises/comprising" when used in this specification is taken to specify the presence of stated features, integers, steps or components. However, the term does not preclude the presence or addition of one or more additional features, integers, steps or components or groups thereof.

The disclosure is not restricted to the described embodiments in the figures, but may be varied freely within the scope of the claims.

The invention claimed is:

1. A method for monitoring search spaces, the method being performed by a wireless device, the method comprising:
    receiving an orthogonal frequency-division multiplexing, OFDM, symbol in a downlink slot, the OFDM symbol being included in a control-resource set, CORESET, of resource elements configured to carry control information, the CORESET having at least one property affecting blind detection in the CORESET;
    identifying at least one first property of the at least one property of the CORESET;
    monitoring at least one particular search space to detect a control message related to the wireless device based on the identified at least one first property;
    when a control message is detected, establishing a location of the control message with respect to at least one of the CORESET and the at least one particular search space;
    when a first location is established for the control message, determining at least one of a first assumed quasi co-location and a first beam pair link for the wireless device, based on the first location established for the control message; and
    when a second location is established for the control message, which second location is different from the first location, determining at least one of a second assumed quasi co-location and a second beam pair link for the wireless device, based on the second location established for the control message.

2. The method according to claim 1, wherein a potential set of search spaces to monitor contains search spaces of different aggregation levels, and the method further comprises:
    selecting a particular subset of the potential set of search spaces based on the identified first property of the CORESET, the particular subset being selected with a distribution of aggregation levels which distribution is based on the identified first property of the CORESET; and
    monitoring the selected subset of said the potential set of search spaces.

3. The method according to claim 2, wherein the at least one property designates a modulation and coding scheme table defining at least one of a transport block size and a modulation order for the resource elements.

4. The method according to claim 1, wherein a potential set of search spaces to monitor contains search spaces of different aggregation levels, and the method further comprises:
    performing a relatively larger proportion of blind detection attempts on search spaces of comparatively high aggregation levels; and
    performing a relatively smaller proportion of blind detection attempts on search spaces of comparatively low aggregation levels.

5. The method according to claim 1, wherein a set of search spaces to monitor has a composition of different aggregation levels, the composition of different aggregation levels representing the identified first property of the CORESET.

6. The method according to claim 1, wherein the at least one property of the CORESET is represented by a variable that assumes one of at least one first value and at least one second value different from the first value.

7. The method according to claim 1, wherein the at least one property of the CORESET specifies starting and ending positions, respectively, of at least one of a physical downlink shared channel, PDSCH, and a physical uplink shared channel, PUSCH.

8. The method according to claim 1, further comprising:
    deriving a length of at least one bitfield in the control message related to the wireless device based on the established location of the control message.

9. The method according to claim 8, comprising:
    deriving the length of at least one of the at least one bitfield in the control message to be relatively longer if the location is established to be in the beginning of a slot; and
    deriving the length of at least one of the at least one bitfield in the control message to be relatively shorter if the location is established not to be in the beginning of the slot.

10. The method according to claim 1, further comprising:
    when the first location is established for the control message, scheduling a physical downlink shared channel, PDSCH, to a first slot; and
    when the second location is established for the control message, scheduling the PDSCH to a second slot.

11. The method according to claim 1, further comprising:
    employing a contention-based grant procedure for one of scheduling and a hybrid automatic repeat request feedback if and only if the control message is established to be located within a particular at least one of a CORESET and a search space.

12. A wireless device comprising processing circuitry and a communication interface, the processing circuitry being configured to cause the wireless device to:
receive an orthogonal frequency-division multiplexing, OFDM, symbol in a downlink slot, the OFDM symbol being included in a control-resource set, CORESET, of resource elements configured to carry control information, the CORESET having at least one property affecting blind detection in the CORESET;
identify at least one first property of the at least one property of the CORESET;
monitor at least one particular search space to detect a control message related to the wireless device based on the identified at least one first property;
when a control message is detected, establish a location of the control message with respect to at least one of the CORESET and the at least one particular search space;
when a first location is established for the control message, determine at least one of a first assumed quasi co-location and a first beam pair link for the wireless device, based on the first location established for the control message; and
when a second location is established for the control message, the second location being different from the first location, determine at least one of a second assumed quasi co-location and a second beam pair link for the wireless device, based on the second location established for the control message.

13. A method for monitoring search spaces, a potential set of search spaces to monitor containing search spaces of different aggregation levels, the method being performed by a wireless device, the method comprising:
receiving an orthogonal frequency-division multiplexing, OFDM, symbol in a downlink slot, the OFDM symbol being included in a control-resource set, CORESET, of resource elements configured to carry control information, the CORESET having at least one property affecting blind detection in the CORESET;
identifying at least one first property of the at least one property of the CORESET; and
monitoring one particular search space to detect a control message related to the wireless device, the particular search space having a distribution of aggregation levels and being selected based on the identified at least one first property of the CORESET;
establishing a location of the control message with respect to at least one of the CORESET and the particular search space;
deriving a length of at least one bitfield in the control message related to the wireless device based on the established location of the control message;
deriving the length of at least one of the at least one bitfield in the control message to be relatively longer if the location is established to be in the beginning of a slot; and
deriving the length of at least one of the at least one bitfield in the control message to be relatively shorter if the location is established not to be in the beginning of the slot.

14. The method according to claim 13, wherein the method further comprises:
performing a relatively larger proportion of blind detection attempts on search spaces of comparatively high aggregation levels; and
performing a relatively smaller proportion of blind detection attempts on search spaces of comparatively low aggregation levels.

15. The method according to claim 13, wherein a composition of the different aggregation levels represents the identified first property of the CORESET.

16. The method according to claim 13, wherein the at least one property of the CORESET is represented by a variable that assumes one of at least one first value and at least one second value different from the first value.

17. The method according to claim 13, wherein the at least one property of the CORESET specifies starting and ending positions, respectively, of at least one of a physical downlink shared channel, PDSCH, and a physical uplink shared channel, PUSCH.

18. The method according to claim 13, further comprising:
scheduling a physical downlink shared channel, PDSCH, to a first slot if a first location is established for the control message; and
scheduling the PDSCH to a second slot, if a second location is established for the control message, the second location being different from the first location.

19. The method according to claim 13, further comprising:
determining at least one of a first assumed quasi co-location and a first beam pair link for the wireless device, if a first location is established for the control message; and
determining at least one of a second assumed quasi co-location and a second beam pair link for the wireless device, if a second location is established for the control message, the second location being different from the first location.

20. The method according to claim 13, further comprising:
employing a contention-based grant procedure for one of scheduling and a hybrid automatic repeat request feedback if and only if the control message is established to be located within a particular at least one of a CORESET and a search space.

21. A wireless device for monitoring search spaces, a potential set of search spaces to monitor containing search spaces of different aggregation levels, the wireless device comprising processing circuitry and a communication interface, the processing circuitry being configured to cause the wireless device to:
receive an orthogonal frequency-division multiplexing, OFDM, symbol in a downlink slot, the OFDM symbol being included in a control-resource set, CORESET, of resource elements configured to carry control information, the CORESET having at least one property affecting blind detection in the CORESET;
identify at least one first property of the at least one property of the CORESET; and
monitor one particular search space for a control message related to the wireless device, the particular search space having a distribution of aggregation levels and being selected based on the identified at least one first property of the CORESET;
establish a location of the control message with respect to at least one of the CORESET and the particular search space;
derive a length of at least one bitfield in the control message related to the wireless device based on the established location of the control message;

derive the length of at least one of the at least one bitfield in the control message to be relatively longer if the location is established to be in the beginning of a slot; and derive the length of at least one of the at least one bitfield in the control message to be relatively shorter if the location is established not to be in the beginning of the slot.

\* \* \* \* \*